United States Patent
Yang et al.

(10) Patent No.: US 11,926,549 B2
(45) Date of Patent: Mar. 12, 2024

(54) TREATMENT PROCESS AND TREATMENT SYSTEM OF ENHANCED UP-FLOW MULTIPHASE WASTEWATER OXIDATION

(71) Applicant: GuangXi Bossco Environmental Protection Technology, GuangXi (CN)

(72) Inventors: Qifeng Yang, Nanning (CN); HongXiang Zhu, Nanning (CN); Guoning Chen, Nanning (CN); Hainong Song, Nanning (CN); Lihai Lu, Nanning (CN); Yanding Qin, Nanning (CN); Xi Liu, Nanning (CN); Yongli Chen, Nanning (CN); Hongfei Lin, Nanning (CN); Qianling Chen, Nanning (CN); Jinglong Wang, Nanning (CN)

(73) Assignee: Guangxi Bossco Environmental Protection Agency, Guangxi (CN)

( * ) Notice: Subject to any disclaimer, the term of this patent is extended or adjusted under 35 U.S.C. 154(b) by 316 days.

(21) Appl. No.: 16/964,559

(22) PCT Filed: Jul. 4, 2019

(86) PCT No.: PCT/CN2019/094757
§ 371 (c)(1),
(2) Date: Jul. 23, 2020

(87) PCT Pub. No.: WO2020/258359
PCT Pub. Date: Dec. 30, 2020

(65) Prior Publication Data
US 2021/0078887 A1   Mar. 18, 2021

(30) Foreign Application Priority Data
Jun. 21, 2019   (CN) .......................... 201910544298.5

(51) Int. Cl.
C02F 9/00    (2023.01)
C02F 1/00    (2023.01)
(Continued)

(52) U.S. Cl.
CPC ................ C02F 9/00 (2013.01); *C02F 1/001* (2013.01); *C02F 2001/007* (2013.01);
(Continued)

(58) Field of Classification Search
CPC ........................................................ C02F 9/00
See application file for complete search history.

(56) References Cited

U.S. PATENT DOCUMENTS

2009/0000752 A1* 1/2009 Dykstra ................ C02F 11/147
162/175

FOREIGN PATENT DOCUMENTS

| CN | 101519251 A | * | 9/2009 | ............... C02F 9/04 |
| CN | 108191039 A | * | 6/2018 | ............... C02F 1/722 |

OTHER PUBLICATIONS

What is Quartz Sand, https://www.beidoou.com/materials/what-is-quartz-sand.html, Date NA.*

* cited by examiner

*Primary Examiner* — Peter Keyworth
(74) *Attorney, Agent, or Firm* — LeonardPatel PC; Sheetal S. Patel; Michael A. Leonard, II

(57) ABSTRACT

The present disclosure discloses a treatment process and treatment system of enhanced up-flow multiphase wastewater oxidation. The treatment process includes the following steps: 1) the wastewater is fed into the up-flow multiphase wastewater oxidation system for oxidation treatment; 2) the wastewater is fed to the solid-liquid separation system for solid-liquid separation, the separated heterogeneous catalytic carrier (5) is fed back to the up-flow multiphase
(Continued)

wastewater oxidation system, and the wastewater is fed to the neutralization and degassing system; 3) the wastewater is fed to the neutralization and degassing system to adjust a pH of the wastewater to 5.5-7.5, and then is degassed by stirring; 4) the wastewater is fed to the flocculation and sedimentation system for sludge-water separation, a supernatant is discharged, and an outward harmless treatment is performed after a pressure filtration of a sedimentary iron sludge.

8 Claims, 3 Drawing Sheets

(51) Int. Cl.
    *C02F 1/20*     (2023.01)
    *C02F 1/38*     (2023.01)
    *C02F 1/52*     (2023.01)
    *C02F 1/66*     (2023.01)
    *C02F 1/72*     (2023.01)
    *C02F 1/78*     (2023.01)
    *C02F 101/30*     (2006.01)
    *C02F 103/28*     (2006.01)
(52) U.S. Cl.
    CPC ................ *C02F 1/20* (2013.01); *C02F 1/385* (2013.01); *C02F 1/52* (2013.01); *C02F 1/66* (2013.01); *C02F 1/725* (2013.01); *C02F 1/727* (2013.01); *C02F 1/78* (2013.01); *C02F 2101/30* (2013.01); *C02F 2103/28* (2013.01); *C02F 2201/784* (2013.01); *C02F 2301/046* (2013.01); *C02F 2305/026* (2013.01)

TREATMENT PROCESS AND TREATMENT SYSTEM OF ENHANCED UP-FLOW MULTIPHASE WASTEWATER OXIDATION

CROSS REFERENCE TO RELATED APPLICATION

This is a national stage application of PCT/CN2019/094757, filed Jul. 4, 2019, which claims priority to CN 201910544298.5 filed Jun. 21, 2019. The subject matter of this earlier filed application is hereby incorporated by reference in its entirety.

TECHNICAL FIELD

The present disclosure relates to an organic wastewater treatment method, in particular to a process and a system of an oxidation treatment of enhanced up-flow multiphase wastewater.

BACKGROUND

Current technology for the treatment of wastewater difficult to be biochemically degraded includes an ozone oxidation method, an activated carbon adsorption method, a Fenton oxidation method, and the like. The Fenton oxidation method ($H_2O_2/Fe^{2+}$) is the most efficient, simple, and economical method.

The combination of ferrous salts (such as ferrous sulfate) and hydrogen peroxide (perhydrol) is called Fenton reagent, which can effectively oxidize and remove refractory organic substances that cannot be removed by conventional wastewater treatment technology. The essence of the Fenton reagent is that $H_2O_2$ generates hydroxyl radicals (•OH) with high reaction activity under the catalytic action of $Fe^{2+}$, and the •OH can react with most organic substances to degrade the organic substances.

In a broad sense, the Fenton oxidation method is a technology for treating organic substances by generating •OH from $H_2O_2$ by using an action of a catalyst, an electrochemical reaction, or the like. However, the simple Fenton oxidation process requires a large amount of $Fe^{2+}$ to be added to maintain sufficient •OH generation, and a large amount of iron sludge is generated during the treatment process, thereby requiring additional treatment cost. In addition, there may also be some very refractory organic substances or residual organic substances that are not degraded. Conventional homogeneous Fenton method has a large amount of iron sludge and a low oxidation efficiency. Conventional heterogeneous Fenton method has a large loss of catalyst, and iron sludge newly generated during the production, processing, and operation is attached to the polymetal to combine into the catalyst, so that the efficiency of the catalyst is reduced.

SUMMARY

The technical problem to be solved by the present disclosure is to provide a process and a system of an oxidation treatment of enhanced up-flow multiphase wastewater. The treatment process combines homogeneous catalysis technology, carrier heterogeneous catalysis technology, and ozone aeration catalysis technology to fully catalyze a Fenton reaction process, and uses residual hydrogen peroxide to secondarily degrade residual organic matters, thereby enhancing the treatment capacity of the conventional up-flow multiphase wastewater treatment system.

The present disclosure solves the aforementioned technical problems by the following technical solutions:

A process of an oxidation treatment of enhanced up-flow multiphase wastewater in accordance with the present disclosure includes the following operation steps:

(1) oxidation treatment: feeding refractory organic wastewater to an up-flow multiphase wastewater oxidation system, the system includes an up-flow multiphase wastewater oxidation tower, the oxidation tower is added with a Fenton reagent, a homogeneous catalytic accelerator, and a heterogeneous catalytic carrier;

(2) solid-liquid separation treatment: feeding the wastewater subjected to the oxidation treatment to a solid-liquid separation system for solid-liquid separation treatment, feeding a separated liquid to a neutralization and degassing system, and feeding the separated heterogeneous catalytic carrier coated in the oxidation tower back to the oxidation tower to realize an effect of enriching the catalyst;

(3) neutralization and degassing treatment: feeding the wastewater treated by the solid-liquid separation system to the neutralization and degassing system, the neutralization and degassing system including a neutralization tower and a degassing tower which are in communication with each other, mixing the wastewater with an added alkali liquor in the neutralization tower to adjust a pH of the wastewater to 5.5-7.5, and then degassing by stirring in the degassing tower; and (4) flocculation and sedimentation treatment: feeding the wastewater subjected to the neutralization and degassing treatment to a flocculation and sedimentation system for sludge-water separation, the flocculation and sedimentation system including a flocculation and sedimentation tank, discharging a supernatant at an upper portion of the flocculation and sedimentation tank after the flocculation and sedimentation of the wastewater, and performing an outward harmless treatment after a pressure filtration of an iron sludge at a bottom of the flocculation and sedimentation tank.

In the step 1), the Fenton reagent is added in an addition amount according to a conventional requirement, the heterogeneous catalytic carrier is added before the system is started, and an addition amount thereof is $\frac{1}{10}$-$\frac{1}{3}$ of a volume of the up-flow multiphase wastewater oxidation tower.

In the step 1), the homogeneous catalytic accelerator is a liquid homogeneous catalytic accelerator and contains trace elements of iron, manganese, cobalt, and nickel. Iron has a concentration of 10 mg/L to 20 mg/L, manganese has a concentration of 5.0 mg/L to 15 mg/L, cobalt has a concentration of 1.0 mg/L to 3.0 mg/L, and nickel has a concentration of 0.5 mg/L to 1.0 mg/L.

In the step 1), the heterogeneous catalytic carrier is a spherical heterogeneous catalytic carrier having a diameter of 2 mm to 5 mm or a polyhedral heterogeneous catalytic carrier having a maximum diagonal distance of 2 mm to 5 mm, and the heterogeneous catalytic carrier is made of an inorganic carrier of ceramic, silica, or activated alumina, or an organic inert carrier of polyvinyl alcohol (PVA) or polyvinyl ether (PVE).

In the step 1), during an operation of the up-flow multiphase wastewater oxidation system, the homogeneous catalytic accelerator is added in an addition amount according to 1 ‰ to 5‰ of an amount of the water to be treated for the first time, and is supplementally added for 5 days to 10 days to maintain the addition amount. Thereafter, after each sand discharge of the system, the homogeneous catalytic accelerator is continuously supplementally added according to 1‰ to 5‰ of the amount of the water to be treated, and is continuously added for 3 days to 5 days.

In the step 2), the solid-liquid separation system uses a fluid blocking separation method by an inclined plate, an inclined pipe, or a blocking net, or uses a cyclone centrifugal separation method, or a gravity separation method.

In the step 3), a mixed air containing ozone having a mass concentration of 1% to 10% is introduced to bottoms of the neutralization tower and the degassing tower for aeration, stirring, and gas stripping. The treatment in the neutralization tower is performed for 15 min to 25 min, and the treatment in the degassing tower is performed for 20 min to 30 min.

In the step 4), the treatment in the flocculation and sedimentation tank is performed for 2 h to 3 h.

A treatment system used in the process of the oxidation treatment of enhanced up-flow multiphase wastewater in accordance with the present disclosure includes an up-flow multiphase wastewater oxidation system, a solid-liquid separation system, a neutralization and degassing system, and a flocculation and sedimentation system which are sequentially connected.

The up-flow multiphase wastewater oxidation system includes an up-flow multiphase wastewater oxidation tower. The up-flow multiphase wastewater oxidation tower is provided with a water distribution cover at a bottom thereof, is filled with a heterogeneous catalytic carrier therein, and is provided with a solid-liquid separator at an upper portion thereof. The water distribution cover and the solid-liquid separator are positioned below and above the heterogeneous catalytic carrier, respectively. A water inlet A and a water inlet circulation tank in communication with the water inlet A are disposed above the solid-liquid separator. The water inlet circulation tank is connected to the water distribution cover at the bottom thereof through a circulation pipe. The circulation pipe is mounted with a circulation pump, and a water outlet A is disposed above the solid-liquid separator.

The solid-liquid separation system includes a cyclone separator. The cyclone separator is provided with a water inlet B in communication with the water outlet A of the up-flow multiphase wastewater oxidation tower at an upper portion thereof, is provided with a sand discharge pipe at a bottom thereof, and is provided with a central pipe for upwardly conveying wastewater therein. The central pipe is provided with a water outlet B at an upper portion thereof.

The neutralization and degassing system includes a neutralization tower and a degassing tower. The neutralization tower and the degassing tower are provided with a microporous aeration disk capable of introducing ozone air and pure oxygen at bottoms thereof, respectively. The neutralization tower and the degassing tower are provided with a gas-liquid two-phase separator at upper portions thereof, respectively. An upper portion of the gas-liquid two-phase separator is connected to a gas-liquid separator through a pipeline. The gas-liquid separator is provided with a downcomer extending into a lower portion of the tower. The neutralization tower is provided with a water inlet C in communication with the water outlet B of the solid-liquid separation system at the lower portion thereof, and is provided with a water outlet C positioned above the gas-liquid two-phase separator at the upper portion thereof. The degassing tower is provided with a water inlet D in communication with the water outlet C at the bottom thereof, and is provided with a water outlet D positioned above the gas-liquid two-phase separator at the upper portion thereof.

The flocculation and sedimentation system includes a flocculation and sedimentation tank. The flocculation and sedimentation tank is connected to the water outlet D of the degassing tower. The flocculation and sedimentation tank is provided with a supernatant discharge port at an upper portion thereof and a sludge discharge port at a bottom thereof.

A gas discharge port of the gas-liquid separator is connected in parallel with two pipeline branches. One branch is connected to a manganese dioxide filler, and the other branch is connected to an air inlet pipe of the microporous aeration disk through a booster fan.

Compared with the prior art, the present disclosure has the following beneficial effects:
1) The present disclosure improves the capability of the oxidation system to catalyze the degradation of organic matters and reduces the adding amount of Fenton reagent by adding a homogeneous catalytic accelerator and a heterogeneous catalytic carrier in an original up-flow multiphase wastewater oxidation system.
2) the present disclosure can continuously supplement catalytic active sites on the surface of the carrier by periodically adding the homogeneous catalytic accelerator, and maintain the catalytic performance of the heterogeneous catalyst.
3) In the present disclosure, the heterogeneous catalytic carrier can be better trapped in the system by adding the solid-liquid separation system, so that the heterogeneous catalytic carrier can continue to function.
4) In the neutralization and degassing processes of the present disclosure, the ozone with a certain concentration and the air are used to be mixed and aerated together, and the introduced ozone can perform catalytic reaction with the residual hydrogen peroxide in the water while maintaining a certain amount of aeration, so that a secondary oxidation process is performed, the treatment effect of the system is improved, and the reagent residue is reduced.

In the figures: 1—up-flow multiphase wastewater treatment oxidation tower; 2—water outlet A; 3—water inlet circulation tank; 4—water inlet A; 5—heterogeneous catalytic carrier; 6—solid-liquid separator; 7—circulation pipe; 8—circulation pump; 9—water distribution cover; 10—cyclone separator; 11—central pipe; 12—sand discharge pipe; 13—neutralization tower; 14—gas-liquid two-phase separator; 15—gas-liquid separator; 16—downcomer; 17—microporous aeration disk; 18—manganese dioxide filler; 19—degassing tower; 20—flocculation and sedimentation tank; 21—water inlet B; 22—water outlet B; 23—water inlet C; 24—water outlet C; 25—water inlet D; 26—water outlet D; 27—supernatant discharge port; 28—sludge discharge port; 29—booster fan.

DETAILED DESCRIPTION OF THE EMBODIMENTS

In order to more clearly illustrate the treatment process of the present disclosure, the technical solution of the present disclosure will be described in further non-limiting detail with reference to the accompanying drawings and specific embodiments.

Figure 1:
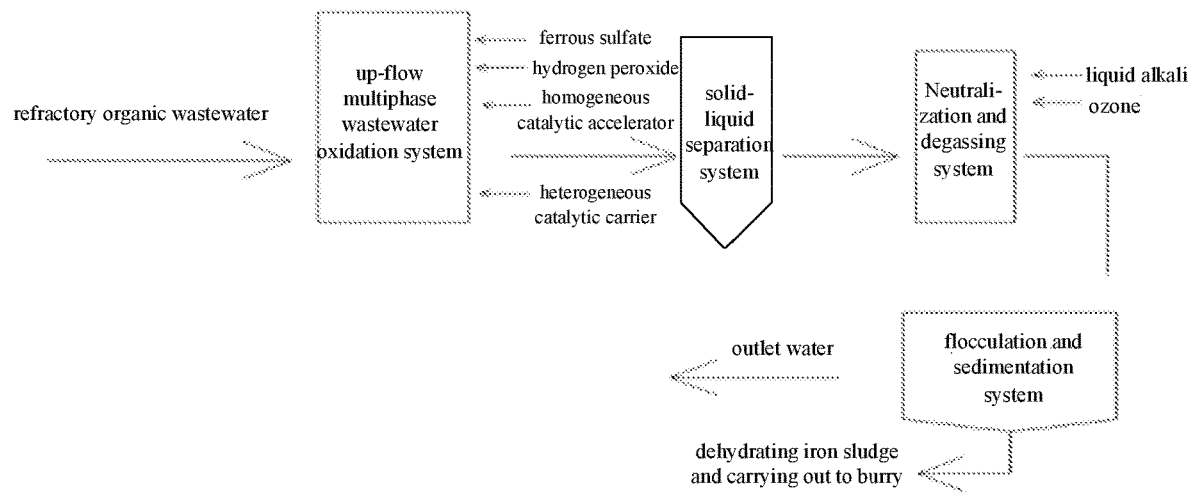
FIG. 1 is a schematic view of an operation flow of a process of an oxidation treatment of enhanced up-flow multiphase wastewater in accordance with the present disclosure.

Referring to FIG. 1, a treatment system used in a treatment process in accordance with the present disclosure includes an up-flow multiphase wastewater oxidation system, a solid-liquid separation system, a neutralization and degassing system, and a flocculation and sedimentation system.

Figure 2:
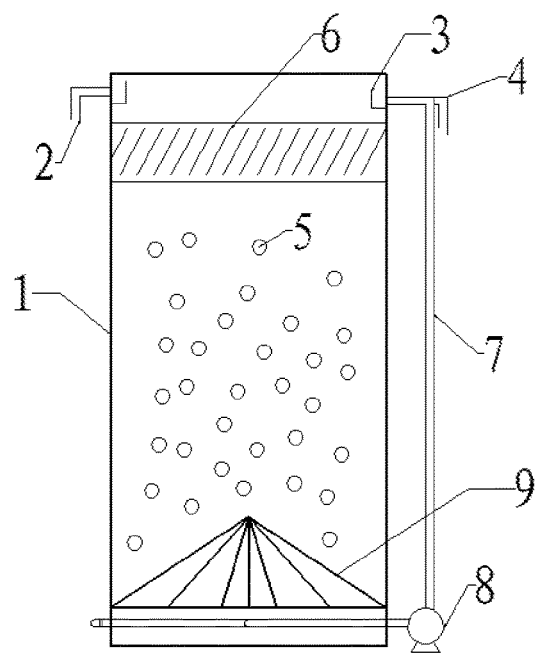
FIG. 2 is a schematic view of an up-flow multiphase wastewater treatment oxidation tower used in a system of an oxidation treatment of enhanced up-flow multiphase wastewater in accordance with the present disclosure.

Referring to FIG. 2, the up-flow multiphase wastewater oxidation system in accordance with the present disclosure includes an up-flow multiphase wastewater oxidation tower 1. The up-flow multiphase wastewater oxidation tower 1 is provided with a water distribution cover 9 at a bottom thereof, is filled with a heterogeneous catalytic carrier 5 therein, and is provided with a solid-liquid separator 6 at an upper portion thereof. The water distribution cover 9 and the solid-liquid separator 6 are positioned below and above the heterogeneous catalytic carrier 5, respectively. A water inlet A 4 and a water inlet circulation tank 3 in communication with the water inlet A 4 are disposed above the solid-liquid separator 6. The water inlet circulation tank 3 is connected to the water distribution cover 9 at the bottom thereof through a circulation pipe 7. The circulation pipe 7 is mounted with a circulation pump 8, and a water outlet A 2 is disposed above the solid-liquid separator 6.

Figure 3:
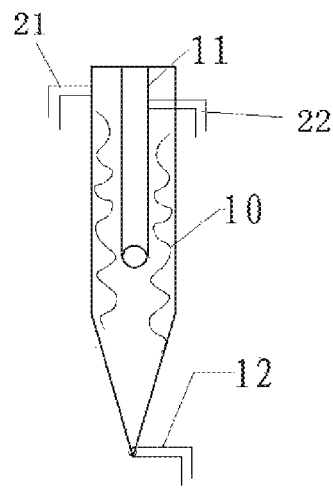
FIG. 3 is a schematic view of a cyclone separator used in the system of the oxidation treatment of enhanced up-flow multiphase wastewater in accordance with the present disclosure.

Referring to FIG. 3, the solid-liquid separation system includes a cyclone separator 10. The cyclone separator 10 is provided with a water inlet B 21 in communication with the water outlet A 2 of the up-flow multiphase wastewater oxidation tower 1 at an upper portion thereof, is provided with a sand discharge pipe 12 at a bottom thereof, and is provided with a central pipe 11 for upwardly conveying wastewater therein. The central pipe 11 is provided with a water outlet B 22 at an upper portion thereof.

Figure 4:
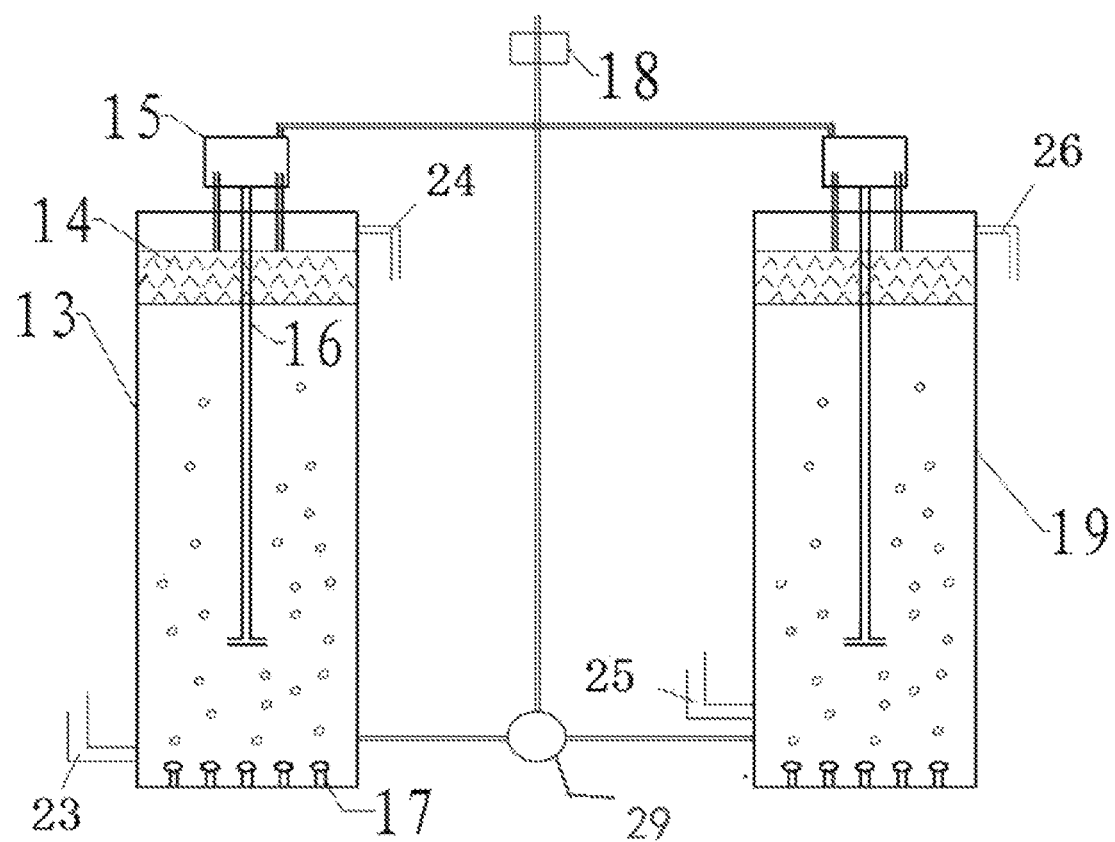
FIG. 4 is a schematic view of a neutralization tower and a degassing tower which are connected with each other used in the system of the oxidation treatment of enhanced up-flow multiphase wastewater in accordance with the present disclosure.

Referring to FIG. 4, the neutralization and degassing system includes a neutralization tower 13 and a degassing tower 19. The neutralization tower 13 and the degassing tower 19 are provided with a microporous aeration disk 17 that can introduce ozone air and pure oxygen at bottoms thereof, respectively. The neutralization tower 13 and the degassing tower 19 are provided with a gas-liquid two-phase separator 14 at upper portions thereof, respectively. An upper portion of the gas-liquid two-phase separator 14 is connected to a gas-liquid separator 15 through a pipeline. The gas-liquid separator 15 is provided with a downcomer 16 extending into lower portions of the neutralization tower 13 and the degassing tower 19. The neutralization tower 13 is provided with a water inlet C 23 in communication with the water outlet B 22 of the solid-liquid separation system at the lower portion thereof, and is provided with a water outlet C 24 positioned above the gas-liquid two-phase separator at the upper portion thereof. The degassing tower 19 is provided with a water inlet D 25 in communication with the water outlet C 24 at the bottom thereof, and is provided with a water outlet D 26 positioned above the gas-liquid two-phase separator at the upper portion thereof. A gas discharge port of the gas-liquid separator 15 is connected in parallel with two pipeline branches. One pipeline branch is connected to a manganese dioxide filler 18, and the other pipeline branch is connected to an air inlet pipe of the microporous aeration disk 17 through a booster fan 29.

Figure 5:
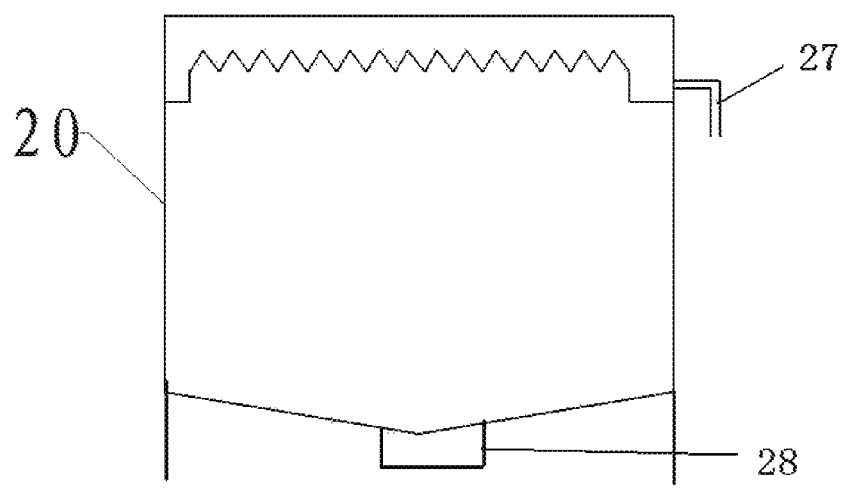
FIG. 5 is a schematic view of a flocculation and sedimentation tank used in the system of the oxidation treatment of enhanced up-flow multiphase wastewater in accordance with the present disclosure.

Referring to FIG. 5, the flocculation and sedimentation system includes a flocculation and sedimentation tank 20, and the flocculation and sedimentation tank 20 is connected to the water outlet D 26 of the degassing tower 19. The flocculation and sedimentation tank 20 is provided with a supernatant discharge port 27 at an upper portion thereof and a sludge discharge port 28 at a bottom thereof.

The specific operation process of the process of the oxidation treatment of enhanced up-flow multiphase wastewater in accordance with the present disclosure is as follows:

At the first step, refractory organic wastewater is first fed to an up-flow multiphase wastewater oxidation system, which includes an up-flow multiphase wastewater oxidation tower 1. The refractory organic wastewater is first fed into a water inlet circulation tank 3 at the top of the up-flow multiphase wastewater oxidation tower 1 through a water inlet A 4. The water inlet circulation tank 3 is added with a Fenton reagent composed of ferrous sulfate and $H_2O_2$ and a homogeneous catalytic accelerator. The wastewater and the reagent are mixed and then enter a water distribution cover 9 at the bottom of the up-flow multiphase wastewater oxidation tower 1 through a circulation pipe 7. The wastewater subjected to the oxidation treatment is subjected to a solid-liquid separation by a solid-liquid separator 6, and then is discharged from a water outlet A 2 for the next procedure.

In this step, the wastewater is first mixed with the Fenton reagent to form •OH with high reaction activity and react with organic molecules to oxidatively degrade high molecular organic matters into small molecular organic matters. The Fenton reagent is in full contact with the homogeneous catalytic accelerator in a good fluidization state of the system to generate more •OH to participate in the reaction under the catalytic action. Meanwhile, metal elements in the homogeneous catalytic accelerator and $Fe^{3+}$ generated by $Fe^{2+}$ and $H_2O_2$ are adsorbed on the surface of the heterogeneous catalytic carrier 5 in a crystallization or precipitation manner to form heterogeneous catalytic particles. The heterogeneous catalytic particles and the homogeneous catalytic accelerator act together to improve the treatment efficiency of the oxidation system.

The Fenton reagent described in this step is added in an addition amount according to a conventional requirement. The heterogeneous catalytic carrier is added before the system is started, and an addition amount thereof is 1/10-1/3 of a volume of the up-flow multiphase wastewater oxidation tower. The heterogeneous catalytic carrier uses a spherical heterogeneous catalytic carrier having a diameter of 2 mm to 5 mm or a polyhedral heterogeneous catalytic carrier having a maximum diagonal distance of 2 mm to 5 mm, which is made of an inorganic carrier of ceramic, silica, or activated alumina, or an organic inert carrier of polyvinyl alcohol (PVA) or polyvinyl ether (PVE).

The homogeneous catalytic accelerator is a liquid homogeneous catalytic accelerator, which contains, but is not limited to, cationic trace elements of iron, manganese, cobalt, and nickel. Iron has a concentration of 10 mg/L to 20 mg/L, manganese has a concentration of 5.0 mg/L to 15 mg/L, cobalt has a concentration of 1.0 mg/L to 3.0 mg/L, and nickel has a concentration of 0.5 mg/L to 1.0 mg/L.

During the operation of the up-flow multiphase wastewater oxidation tower, the homogeneous catalytic accelerator is added in an addition amount according to 1‰ to 5‰ of an amount of the water to be treated for the first time, and is supplementally added for 5 days to 10 days to maintain the addition amount. Thereafter, after each sand discharge of the system, the homogeneous catalytic accelerator is continuously supplementally added according to 1‰ to 5‰ of the amount of the water to be treated, and is continuously added for 3 days to 5 days.

At the second step, the wastewater treated by the up-flow multiphase wastewater oxidation system is fed to a solid-liquid separation system. The solid-liquid separation system may use a cyclone separator 10. The outlet water from the up-flow multiphase wastewater oxidation tower 1 is fed to the cyclone separator 10 through the water outlet A 2. Part of the heterogeneous catalytic carriers 5 flowing to an interior of the cyclone separator 10 are enriched at the bottom of the cyclone separator 10 by the cyclone effect, and after reaching a certain amount, the heterogeneous catalytic carriers 5 can be discharged through the sand discharge pipe 12 for activation, regeneration, and reusing. The separated wastewater is discharged through the central pipe 10 and the water outlet B 24 for the next procedure.

The solid-liquid separation system may use a fluid blocking separation method by an inclined plate, an inclined pipe, or a blocking net, or may also use a cyclone centrifugal separation method or a gravity separation method.

At the third step, the separated wastewater is fed into a neutralization and degassing system, which includes a neutralization tower 13 and a degassing tower 19 which are in communication with each other. The wastewater is first fed to the neutralization tower 13, and the alkali liquor is added into the neutralization tower 13. Meanwhile, a mixed air containing ozone having a mass concentration of 1% to 10% is introduced to the bottom of the neutralization tower 13 through a microporous aeration disk 17 and an air inlet pipe connected thereto for aeration and stirring. The treatment is performed for 15 min to 25 min to adjust a pH value of the wastewater to 5.5-7.5. Then, the wastewater is subjected to a gas-liquid separation treatment by the gas-liquid two-phase separator 14, and then the wastewater is fed to the degassing tower 19, and a PAM solution is added to the degassing tower 19. Meanwhile, a mixed air containing ozone having a mass concentration of 1% to 10% is introduced to the bottom of the degassing tower 19 for gas stripping, and the treatment is performed for 20 min to 30 min. Then, the wastewater is subjected to a gas-liquid separation treatment by the gas-liquid two-phase separator 14, and then the wastewater is fed to a flocculation and sedimentation system.

The gas-liquid two-phase separator 14 can collect carbon dioxide gas generated by the reaction and the residual ozone gas which is not completely reacted. The gas-liquid separator 15 is configured to separate the mixed liquid of the wastewater and the residual mixed gas by gas stripping. The residual mixed gas includes ozone and air, or ozone and pure oxygen. An ozone concentration and pressure monitoring device may be disposed above the gas-liquid separator 15. When the ozone concentration in the gas-liquid separator 15 is higher, the mixed gas in the gas-liquid separator is conveyed to the bottom of the neutralization tower and the bottom of the degassing tower through the booster fan 29 for secondary aeration, so that the residual ozone can be fully utilized and an advanced catalytic reaction is performed with hydrogen peroxide, and meanwhile, the liquid alkali added to the neutralization tower and the PAM solution added to the degassing tower are stirred until the ozone concentration and the pressure in the gas-liquid separator are monitored to be not capable of meeting the requirements for reuse. When the mixed gas in the gas-liquid separator does not meet the requirements for reuse, the mixed gas is discharged to the manganese dioxide filler 18 to absorb the residual low-concentration ozone, so that the discharged mixed gas meets the discharge requirement.

In this step, the mass transfer efficiency can be improved by microporous aeration, and the residual hydrogen peroxide in the wastewater is catalytically decomposed under the aeration action of ozone to form new •OH, so that the new •OH is further reacted with the residual small molecular organic matters to achieve secondary oxidative degradation.

At the fourth step, the wastewater treated by the neutralization and degassing system is fed to the flocculation and sedimentation system. The flocculation and sedimentation system includes a flocculation and sedimentation tank 20. The wastewater enters the flocculation and sedimentation tank 20 and is subjected to the flocculation and sedimentation with an added flocculant in the tank. The sedimentary sludge (iron sludge) is discharged from the sludge discharge port 28 after gravity concentration, is subjected to dehydration and pressure filtration, and is transported outward for harmless treatment. The supernatant at an upper portion of the sedimentation tank is discharged through the supernatant discharge port 27 after reaching the standard. The treatment in the flocculation and sedimentation tank 20 is performed for 2 h to 3 h.

The working principle of the system of the treatment oxidation enhanced up-flow multiphase wastewater in accordance with the present disclosure is as follows:

In the present disclosure, the liquid homogeneous catalytic accelerator containing iron ions and trace elements such as manganese, cobalt, nickel, and the like is introduced into the up-flow multiphase wastewater treatment system, and is added to the oxidation system together with the Fenton reagent at regular intervals, so that during the reaction, transition metals can catalyze and accelerate the migration of electrons during the Fenton reaction by utilizing the affinity of d orbital which is not full of electrons to the electrons, and the reaction efficiency is improved. In addition, the spherical heterogeneous catalytic carrier having the diameter of 2 mm to 5 mm or the polyhedral heterogeneous catalytic carrier having the maximum diagonal distance of 2 mm to 5 mm is introduced, the heterogeneous catalytic carrier adsorbs metal ions in the homogeneous catalytic accelerator added along with the reagent on the heterogeneous catalytic carrier to form a heterogeneous catalyst by adsorption during the process of water distribution fluidization in the oxidation system. Although the catalyst loses activity after being covered by the iron sludge in the conventional heterogeneous catalytic Fenton system, the regularly added homogeneous catalytic accelerator is continuously adsorbed by the carrier and the iron sludge attached to the carrier in the process of the present disclosure, so that the surface layer of the catalyst always has a catalytic active body, and the problem of decreased catalyst activity is solved.

In order to prevent the heterogeneous catalytic carrier from being easily carried out of the oxidation system by up-flow due to small particle size and small density in an initial stage of film coating, the present disclosure is specially provided with the solid-liquid separation system, and the heterogeneous catalytic carrier can be retained in the oxidation system to the maximum extent under the action of the solid-liquid separation system, thereby reducing the frequency of addition and replacement of the carrier.

In the present disclosure, the outlet water treated by the solid-liquid separation system enters the neutralization and degassing system. The conventional neutralization and degassing system mainly neutralizes the hydrogen ions added and newly generated during the Fenton reaction by adding alkali, and blows out small molecular volatile organic matters and part of the residual hydrogen peroxide from the system the aeration action. In the process of the present disclosure, the mixed air containing ozone having the mass concentration of 1% to 10% is used for aeration and stirring of the wastewater subjected to the alkali neutralization, and the ozone and the residual hydrogen peroxide in the mixed solution can perform the advanced oxidation reaction in the process to release •OH, so that residual organic pollutants are degraded, and the quality of outlet water is further improved.

Finally, the outlet water treated by the neutralization and degassing system is fed into the flocculation and sedimentation tank. The iron sludge in the flocculation and sedimentation tank further undergoes the flocculation and sedimentation. The sedimentary sludge is gravity concentrated and dehydrated, and then is carried out for the outward harmless treatment. The supernatant outlet water is discharged after reaching the standard.

The following are examples of the application of the present disclosure:

Example 1

The biochemical outlet water of a paper mill was treated by adopting the treatment process of the present disclosure. The raw wastewater had a chemical oxygen demand (COD) of 365 mg/L and had a chroma of 80 times. The wastewater was fed to a water inlet circulation tank at a top of an oxidation tower by a lift pump, and $H_2O_2$ and $FeSO_4 \cdot 7H_2O$ were added to the water inlet circulation tank. An addition amount of the two reagents was: a mass ratio of $H_2O_2$ to the COD to be treated in the wastewater was 1.5:1. In other words, the addition amount of $H_2O_2$ was 547.5 mg/L, and a molar ratio of $H_2O_2$ to $Fe^{2+}$ was 5:1, namely the addition amount of $FeSO_4 \cdot 7H_2O$ was 895 mg/L. Before the treatment system is started, silica crystals with a uniform width and with a maximum diagonal distance of 2 mm were added in accordance with ⅕ of a volume of the reactor, and liquid homogeneous catalytic accelerator was added in an addition amount according to 1‰ of an amount of the designed water to be treated. The liquid homogeneous catalytic accelerator was prepared by diluting a salt solution of $FeSO_4$, $CoCl_2$, $NiSO_4$, and $MnCl_2$, in which Fe had a mass concentration of 10 mg/L, Mn had a mass concentration of 10 mg/L, Co had a mass concentration of 2 mg/L, and Ni had a mass concentration of 0.5 mg/L. The liquid homogeneous catalytic accelerator was added continuously for 3 days.

The wastewater was fed into a cyclone separator for separation for 3 min to 5 min after being discharged from the oxidation tower, and then was fed into a neutralization tower for acid-base neutralization. Liquid alkali was added into the neutralization tower to adjust a pH to 6-7.5. During the period, ozone was aerated and stirred at the bottom of the neutralization tower, meanwhile, ozone reacted with residual hydrogen peroxide in the wastewater, and part of organic pollutants were degraded. The retention time at this stage was 15 min to 20 min. The neutralized wastewater was fed into a degassing tower, and ozone was introduced to a microporous aeration disk at the bottom of the degassing tower for degassing by stirring, and the degassing was performed for 20 min to 30 min. Then, 0.05 mg/L of PAM was added to form flocs, meanwhile, an advanced oxidation reaction was performed on the ozone and the residual hydrogen peroxide in the mixed solution to further degrade residual organic pollutants. The degassed wastewater was fed into a flocculation and sedimentation tank, and the retention time in the flocculation and sedimentation tank was 2 h to 3 h. The sludge-water separation were performed, the supernatant outlet water was discharged, and an outward harmless treatment was performed after a pressure filtration of the sedimentary iron sludge. After the treatment, the COD of the outlet water was reduced to 50 mg/L, and the chroma was reduced to 5 times.

Example 2

The biochemical wastewater outlet water of a starch factory was treated by adopting the treatment process of the present disclosure. The raw wastewater had a COD of 472 mg/L and had a chroma of 75 times. The wastewater was fed to a water inlet circulation tank at a top of an oxidation tower by a lift pump, and $H_2O_2$ and $FeSO_4 \cdot 7H_2O$ were added to the water inlet circulation tank. An addition amount of the two reagents was: a mass ratio of $H_2O_2$ to the COD to be treated in the wastewater was 1.8:1. In other words, the addition amount of $H_2O_2$ was 850 mg/L, and a molar ratio of $H_2O_2$ to $Fe^{2+}$ was 12:1, namely the addition amount of $FeSO_4 \cdot 7H_2O$ was 579 mg/L. Before the treatment system is started, heterogeneous catalytic carrier was added in accordance with 1/10 of a volume of the reactor. The heterogeneous catalytic carrier was formed by mixing silica crystals with a maximum diagonal distance of 2 mm and active alumina balls with a diameter of 5 mm according to a volume ratio of 1:3, and liquid homogeneous catalytic accelerator was added in an addition amount according to 1‰ of an amount of the designed water to be treated. The liquid homogeneous catalytic accelerator was prepared by diluting a salt solution of $FeSO_4$, $CoCl_2$, $NiSO_4$, and $MnCl_2$, in which Fe had a mass concentration of 10 mg/L, Mn had a mass concentration of 10 mg/L, Co had a mass concentration of 2 mg/L, and Ni had a mass concentration of 0.5 mg/L The liquid homogeneous catalytic accelerator was added continuously for 3 days.

The wastewater was fed into a cyclone separator for separation for 3 min to 5 min after being discharged from the oxidation tower, and then was fed into a neutralization tower for acid-base neutralization. Liquid alkali was added into the neutralization tower to adjust a pH to 5.5-7.5. During the period, ozone was aerated and stirred at the bottom of the neutralization tower, meanwhile, ozone reacted with residual hydrogen peroxide in the wastewater, and part of organic pollutants were degraded. The retention time at this stage was 20 min to 25 min. The neutralized wastewater was fed into a degassing tower, and ozone was introduced to a microporous aeration disk at the bottom of the degassing tower for degassing by stirring, and the degassing was performed for 25 min to 30 min. Then, 0.05 mg/L of PAM was added to form flocs, meanwhile, an advanced oxidation reaction was performed on the ozone and the residual hydrogen peroxide in the mixed solution to further degrade residual organic pollutants. The degassed wastewater was fed into a flocculation and sedimentation tank, and the retention time in the flocculation and sedimentation tank was 2 h to 3 h. The sludge-water separation was performed, the supernatant outlet water was discharged, and an outward harmless treatment was performed after a pressure filtration of the sedimentary iron sludge. After the treatment, the COD of the outlet water was reduced to 56 mg/L, and the chroma was reduced to 4.5 times.

It should be noted that the above-mentioned embodiments are merely illustrative of the technical concepts of the present disclosure, and are intended to enable those skilled in the art to understand the contents of the present disclosure and implement the present disclosure, and not to limit the scope of the present disclosure. All equivalent changes and modifications made according to the spirit of the present disclosure should be covered in the protection scope of the present disclosure.

What is claimed is:

1. A process of an oxidation treatment of enhanced up-flow multiphase wastewater, comprising the following operation steps:
   1) feeding refractory organic wastewater to an up-flow multiphase wastewater oxidation system ("system"), wherein the system comprises an up-flow multiphase wastewater oxidation tower, the oxidation tower is added with a Fenton reagent, a homogeneous catalytic accelerator, and a heterogeneous catalytic carrier;
   2) feeding the wastewater subjected to the oxidation treatment to a solid-liquid separation system for solid-liquid separation treatment, feeding a separated liquid to a neutralization and degassing system, and feeding the separated heterogeneous catalytic carrier coated in the oxidation tower back to the oxidation tower to realize an effect of enriching a catalyst;
   3) feeding the wastewater treated by the solid-liquid separation system to the neutralization and degassing system, the neutralization and degassing system comprising a neutralization tower and a degassing tower which are in communication with each other, mixing the wastewater with an added alkali liquor in the neutralization tower to adjust a pH of the wastewater to 5.5-7.5, and then degassing by stirring in the degassing tower, wherein
   in the step 3) a mixed air containing ozone having a mass concentration of 1% to 10% is introduced to bottoms of the neutralization tower (13) and the degassing tower (19) for aeration, stirring, and gas stripping, the treatment in the neutralization tower (13) is performed for 15 min to 25 min, and the treatment in the degassing tower (19) is performed for 20 min to 30 min; and
   4) feeding the wastewater subjected to the neutralization and degassing treatment to a flocculation and sedimentation system for sludge-water separation, the flocculation and sedimentation system comprising a flocculation and sedimentation tank, discharging a supernatant at an upper portion of the flocculation and sedimentation tank after the flocculation and sedimentation of the wastewater, and performing at a bottom of the flocculation and sedimentation tank (20), an outward harmless treatment after a pressure filtration of an iron sludge.

2. An up-flow enhanced multiphase oxidation wastewater treatment method, comprising the following operation:
   feeding refractory organic wastewater to an up-flow multiphase wastewater oxidation unit, wherein the up-flow multiphase wastewater oxidation unit is previously added a given mass of heterogeneous catalyzer carrier, and being added with Fenton agent and homogeneous catalyzer carrier;
   sending an oxidation tower effluent water to a solid-liquid separation unit for solid-liquid separation, discharging a catalyzer carrier from the bottom of the separation unit and returned to the oxidation tower to achieve catalyzer enrichment, and subsequently flowing water from top of the separation unit to a neutralization degassing process;
   executing the neutralization degassing process by a neutralization unit and an aeration unit, wherein the executing the neutralization degassing process comprising
      adjusting, by the neutralization unit, wastewater pH to 5.5 to 7.0 by mixing with alkali, and
      inputting, by the aeration unit, the gas into the wastewater to degassing volatile organic components, wherein the gas being inserted into wastewater from bottom of the neutralization unit and the aeration unit contains 1% to 10% mass concentration ozone for aeration, stirring, and gas stripping; and
   after executing the neutralization degassing process, flowing the wastewater into a sedimentation unit for sludge-water separation, and discharging clean water from top of sedimentation unit and discharging iron sludge discharged from bottom of the sedimentation tank.

3. An up-flow enhanced multiphase oxidation wastewater treatment method according to claim 2, further comprising:
   adding the heterogeneous catalyzer carrier prior to feeding the refractory organic wastewater to the oxidation tower, wherein an amount added is $\frac{1}{10}$-$\frac{1}{3}$ of a volume of the tower.

4. An up-flow enhanced multiphase oxidation wastewater treatment method according to claim 3, further wherein the homogeneous catalyzer carrier is liquid and contains trace elements of iron, manganese, cobalt, and nickel, wherein iron has a concentration of 10 mg/L to 20 mg/L, manganese has a concentration of 5.0 mg/L to 15 mg/L, cobalt has a concentration of 1.0 mg/L to 3.0 mg/L, and nickel has a concentration of 0.5 mg/L to 1.0 mg/L.

5. An up-flow enhanced multiphase oxidation wastewater treatment method according to claim 4, wherein the heterogeneous catalyzer carrier is a spherical heterogeneous catalyzer carrier having a diameter of 2 mm to 5 mm or a polyhedral heterogeneous catalyzer carrier having a maximum diagonal distance of 2 mm to 5 mm, and the heterogeneous catalyzer carrier is made of an inorganic carrier of ceramic, silica, or activated alumina, or an organic inert carrier of polyvinyl alcohol (PVA) or polyvinyl ether (PVE).

6. An up-flow enhanced multiphase oxidation wastewater treatment method according to claim 2, further comprising:
   calculating an amount of catalyst added as 1% of the treated water for first time;
   continuously adding for 5 days to 10 days to maintain the addition amount; and
   after each time the catalyzer carrier is discharged from the bottom of the separation unit, continuously supplementally adding a homogeneous catalyzer accelerator according to 1% to 5% of an amount of the water to be treated, and continuously adding for 3 days to 5 days.

7. An up-flow enhanced multiphase oxidation wastewater treatment method according to claim 2, wherein the solid-liquid separation unit is designed based on a principle of gravity separation and installed on an inclined plate, inclined pipe, or a blocking net inside, and
   the separation unit is designed based on a principle of cyclone separation.

8. An up-flow enhanced multiphase oxidation wastewater treatment method according to claim 2, further comprising:

performing hydraulic retention time (HRT) in the neutralization unit for 15 min to 25 min, and performing the HRT in the aeration unit for 20 min to 30 min.

\* \* \* \* \*